B. L. LONGFELLOW & E. C. ROGERS.
BUTTER CUTTING MACHINE.
APPLICATION FILED FEB. 7, 1914.
1,122,960.
Patented Dec. 29, 1914.
3 SHEETS—SHEET 3.
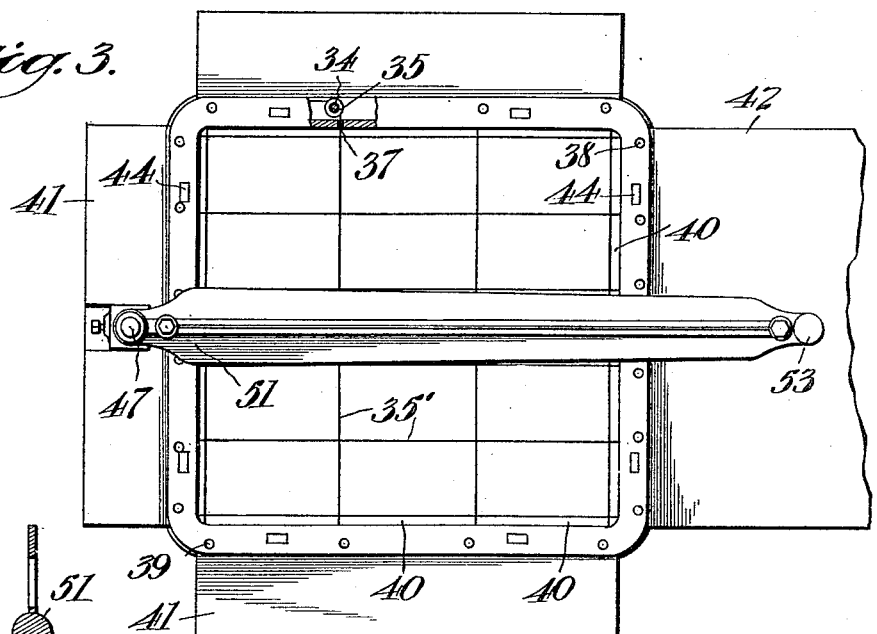
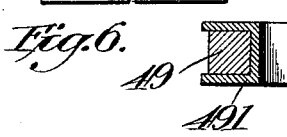
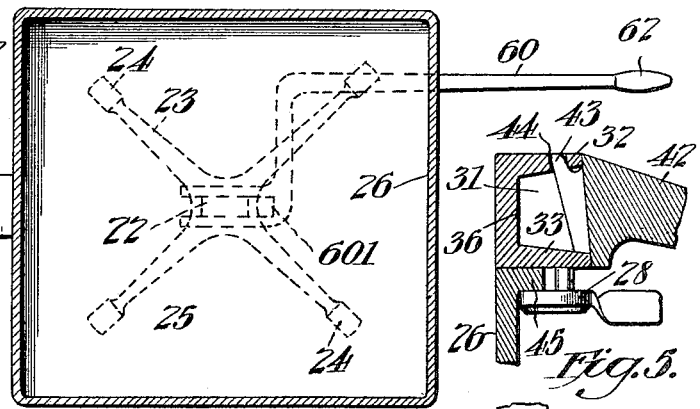
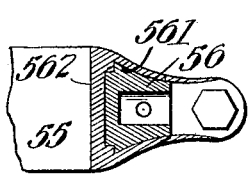
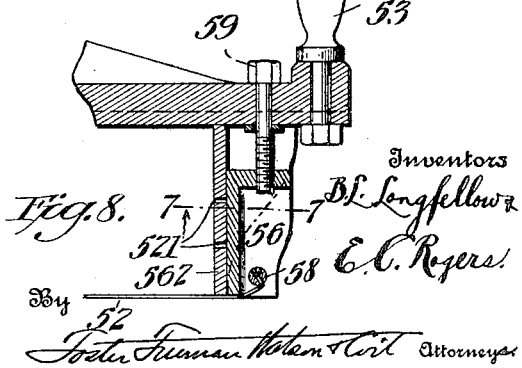
THE NORRIS PETERS CO., PHOTO-LITHO., WASHINGTON, D. C.

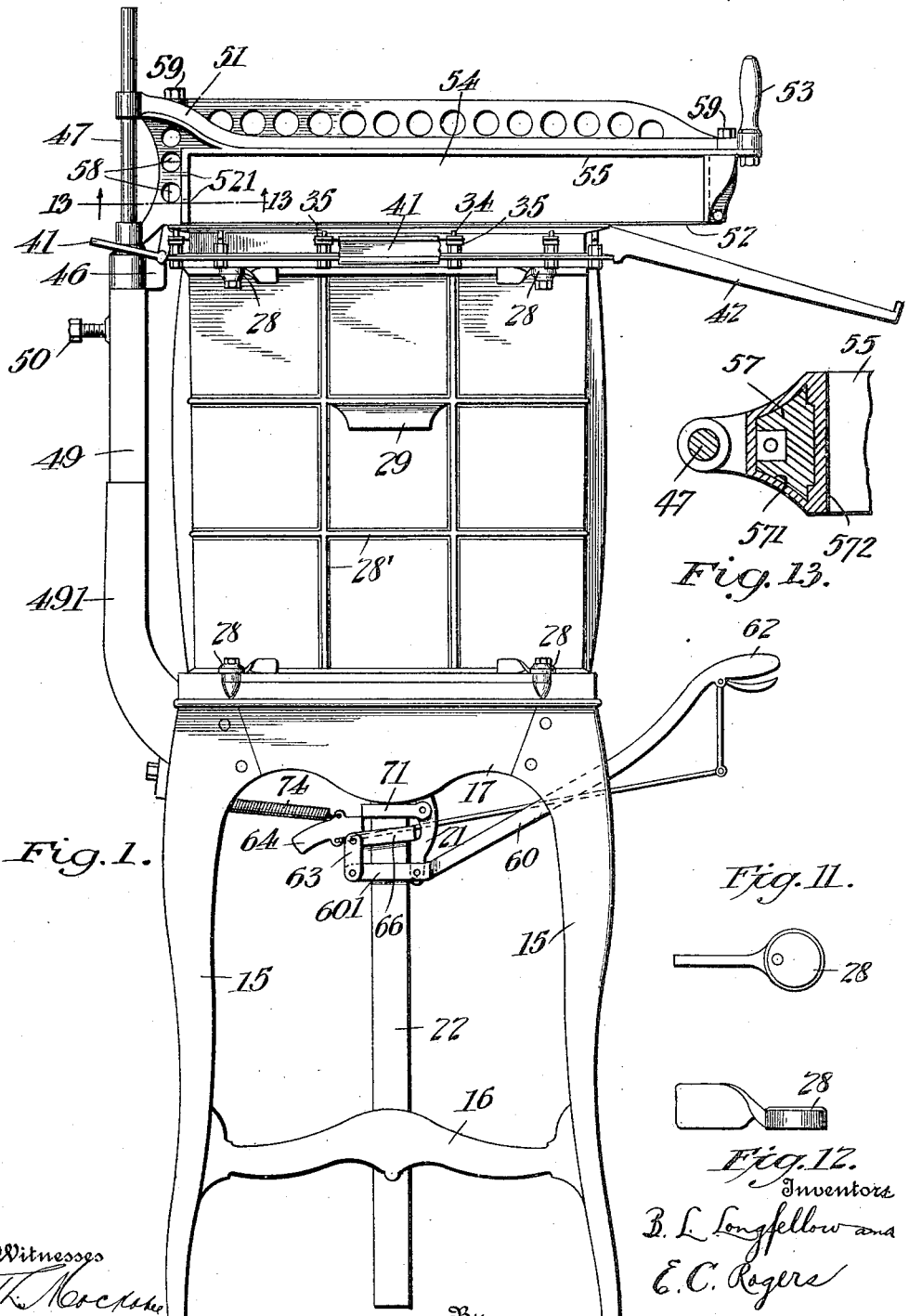

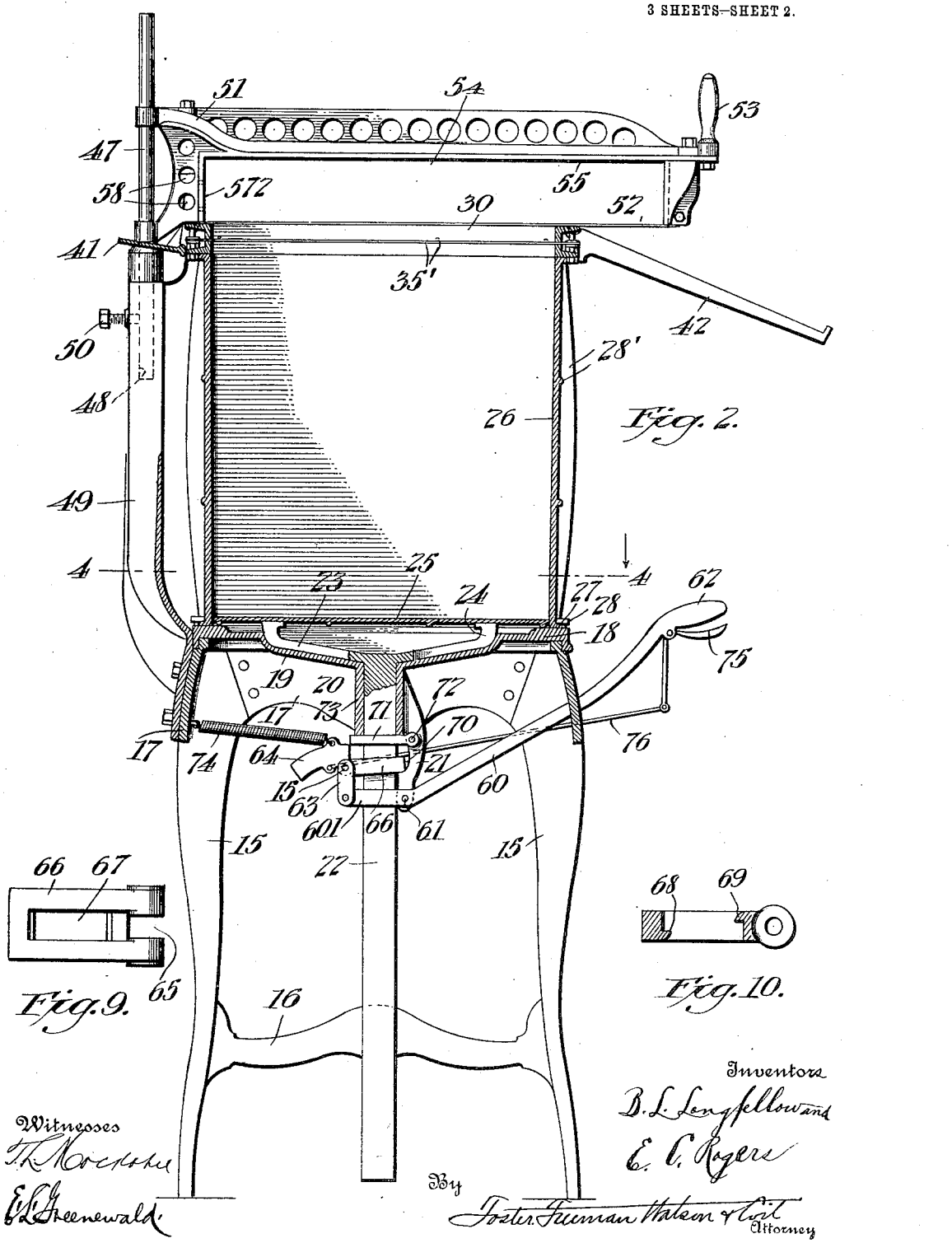

UNITED STATES PATENT OFFICE.

BURL L. LONGFELLOW AND ELWOOD C. ROGERS, OF SALINE, MICHIGAN.

BUTTER-CUTTING MACHINE.

1,122,960.  Specification of Letters Patent.  Patented Dec. 29, 1914.

Application filed February 7, 1914. Serial No. 817,259.

*To all whom it may concern:*

Be it known that we, BURL L. LONGFELLOW and ELWOOD C. ROGERS, citizens of the United States of America, and residents of Saline, county of Washtenaw, State of Michigan, have invented certain new and useful Improvements in Butter-Cutting Machines, of which the following is a specification.

This invention relates to cutting machines for plastic substances and more particularly to a machine for cutting butter, oleomargerin, and the like.

The principal object of this invention is to construct a machine for cutting butter and like substances into bricks of exactly the same dimensions and weight, since it has been found that in many machines of this class now on the market subsequent weighing and patching or scraping is necessary in order to maintain uniformity in the weights of the bricks cut.

Another object of the invention is to provide a novel receptacle for the butter or other material in which the material may be packed and set away in a refrigerating room to harden. The receptacle has a bottom slidable therein and is designed so that it may be mounted on the frame of the machine in such a position that the movable bottom may be lifted by suitable mechanism to extrude the butter.

Another object of the invention is to provide a novel cutter frame for cutting the material vertically as it is extruded from the receptacle.

Another object of the invention is to provide a novel means for pressing or extruding the material from the open end of the receptacle and for maintaining the extruding device in any particular position.

Another object of the invention is to provide a suitable transversely movable cutting wire which is adjustable to vary the thickness of the bricks cut.

Another object of the invention is to provide shelving to catch scraps of butter dropping from the edge of the cutter frame.

The above and other objects and the novel features of the invention will be apparent from the following description taken in connection with the drawing, in which:

Figure 1 is a side elevation of the machine; Fig. 2 is a vertical sectional view of the machine; Fig. 3 is a plan view of the machine; Fig. 4 is a cross sectional view taken along the line 4—4 looking in the direction of the arrows; Fig. 5 is a detailed view of a section of the cutter frame showing the manner of attaching it to the butter receptacle and also the manner of locking the shelves to the cutter frame; Fig. 6 is a transverse cross sectional view of the transversely movable cutting device; Fig. 7 is a detailed sectional view of the same taken along the line 7—7 of Fig. 8; Fig. 8 is a sectional view of one end of the transversely movable butter cutting device; Fig. 9 is a plan view; Fig. 10 is a longitudinal cross sectional view of one of the links comprising the lifting device; Fig. 11 is a plan view; Fig. 12 is an elevation of one of the cam devices for securing the butter receptacle to the table of the machine and for securing the cutter frame to the butter receptacle, and Fig. 13 is a sectional view of a detail on line 13—13 of Fig. 1.

Referring to the drawings, the machine comprises generally a table upon which the butter receptacle may be set and secured. The butter receptacle is adapted to support at its upper end a cutter frame which is provided with cross-wires for cutting the butter vertically as it is pressed from the frame by a plunger mounted on the table and entering the receptacle at the bottom thereof. A bracket rising at the rear of the machine from the table pivotally supports the cutter frame which divides the material vertically and also supports a transversely movable cutting device by means of which the material may be cut horizontally. Shelving detachably secured to the cutter frame on the butter receptacle and surrounding the latter at its upper end serves to catch and save any scraps which may fall when the butter is cut transversely.

The supporting frame of the machine comprises the four legs designated by the numeral 15 which are connected near their lower ends by braces 16 and are joined at their upper ends by the plates 17, thereby forming a frame which is open at the top. Fitting onto the upper end of the frame of the machine is a table 18 which engages over the upper edges of the legs 15 and plates 17. The table 18 is depressed within its margins as shown in Fig. 2 having a dish-shaped portion 19, and a hollow boss 20 at the center of the dish-shaped portion 19.

On the exterior of the hollow boss 20 and at one side of the same there is a depending bracket 21 which supports the operating mechanism for a plunger comprising a stem or rod 22 having the four curved arms 23 at its upper end. The arms 23 are curved so as to fit within the recessed portion 19 of the table and have vertically extending ends 24 with flat upper faces to engage the underside of a movable or false bottom 25 of a butter receptacle 26 which is adapted to be supported on the top of the table 18. At its lower edge, the receptacle 26 has a flange 27, and two eccentric locking devices 28 at each of the edges of the table 18 are adapted to clamp over the flange 27 to secure the receptacle 26 in place on the table 18.

The receptacle 26 is preferably cast of aluminum and provided with vertically and horizontally extending strengthening ribs 28' and handles 29 on its outer surface. The aluminum box will not rust or warp out of shape and may be kept perfectly sanitary and will be very easily cleaned and is strong and durable. However, the box may be made of other suitable material such as cypress wood which is less expensive than aluminum and satisfactory in some machines. The metal boxes are preferable, however, as they will remain in perfect shape indefinitely and will not warp or become distorted and make uneven bricks. The box herein shown is rounded at the corners and well reinforced to prevent any distortion of the same and will therefore always be of exactly the same shape as the steel cutter frame 30 which it supports and through which the butter is extruded from the box.

The cutter frame 30 comprises a cast rectangular steel frame having substantially the same interior dimensions as the exterior of the box 26. Extending along the laterally exterior edges of the frame 30 is a groove 31 which has the upper wall 32 and the lower wall 33 drilled at intervals to receive the spindles or supports 34 of rollers 35, upon which the cutter wire is strung. The wall 36 comprising the bottom of the groove has an opening 37 extending therethrough adjacent each roller 35 so that the cutter wire may pass therethrough. One end of the cutter wire is secured to a tension post 38 and the wire is then passed across and back in the same direction on the frame and around the rollers 34 of two opposite edges to form the cutting wires extending in one direction. The wire is then strung transversely at right angles to the former lengths so that the butter pressed therethrough will be divided into rectangular portions, and the other end is finally brought to a tension post 39. By applying or letting off tension at the posts 38 or 39, the wire comprising the vertical cutting means may be kept at a uniform tension on the entire frame as the tension will be transmitted the length of the wire since the parts are free to move around the rollers.

Referring to Fig. 3, it will be seen that the wires running along contiguous to the inner edge of the frame 30 are spaced therefrom a short distance and consequently thin slices or scraps of butter will be left along the lateral edges as the butter is pressed from the receptacle 26, due to the spaces 40 between the said wires and the edges of the frame. It has been found that the inner faces of the butter cutting frame will not provide sufficiently accurate cutting surfaces for the bricks at the edges and therefore in order to have each brick of exactly the proper weight, the lateral faces of the frame are not used for the purpose of cutting the butter but instead wires are used for this purpose altogether. In order to catch the scraps resulting from this arrangement of the cutting wires, we provide shelving which surrounds the cutter frame on all sides. The shelving consists of three detachable shelves 41 supported at the rear and on opposite sides of the frame 30 and a detachable packing shelf 42 supported from the front of the frame. The attached edges of the shelves 41 and 42 are provided with supporting hooks 43, the upper ends of which engage in recesses 44 in the upper wall 32 of the frame 30 and the lower edges of the hooks 43 abut against the top surface of the lower wall 33. The attached edges of the shelves also abut against the outer edge of the frame and are thereby sufficiently braced so that they will be able to support a moderate load. The frame 30 is also provided with pivoted cam locking devices 28 which are shown in detail in Figs. 11 and 12, and similar to those which engage the receptacle at the bottom. The locking devices on the frame 30 engage a flange 45 at the upper end of the receptacle 26, whereby the frame may be rigidly and detachably secured to the butter receptacle 26.

The cutter frame has a rearwardly extending lug 46 which has an opening therethrough to pivot the cutter on a vertical spindle 47 fitting in a socket 48 at the upper end of a standard 49 fitting in a bracket 491 secured to a cross plate 17 of the frame at the rear of the machine. A set screw 50 is provided to adjust the spindle 47 and prevent the same from turning. By this arrangement, the cutter frame when desired may be raised and swung laterally out of the way which provides a sanitary manner of disposing of the frame 30 while changing butter receptacles. There will thus be no danger of putting the cutter frame in an unclean place while it is not in use and frequent adjustment of the same will not be necessary. The rear shelf supported by the cutter frame 30 is recessed to take the standard so that the latter will not interfere therewith.

Pivotally mounted on the spindle 47 and above the lug 46 is a frame 51 which carries the cutter wire 52 and is provided at its outer end with an operating handle 53. The cutter wire 52, as well as wire 35' strung on frame 30, is of tempered German silver and is stretched across the lower side of the frame 51 and a sufficient space 54 between the cutter wire 52 and the inner surface 55 of the frame is left whereby a gage is provided so that the proper thickness of butter to form the desired weight of brick will be cut by the wire 52. The wire 52 is movable with the frame 51 transversely of the cutter frame 30 and around the pivot 47. A pair of slidable members 56, 57 sliding vertically in dove-tail grooves 561 and 571 at the outer sides of the end walls 562 and 572 respectively carry tension bolts 58 to which the wire 52 is secured and by means of which it may be maintained at a uniform tension. The walls 562 and 572 have holes 521 extending therethrough at intervals to receive the wire 52 at its several adjusted positions. The slides 56, 57 are vertically adjustable by means of the bolts 59, the threaded ends of which engage a threaded hole in the upper walls of the slides. By the arrangement described, the wire 52 is kept at a proper tension. The details of the adjustment at the outer or free end of the frame is shown in detail in Figs. 7 and 8.

The lifting mechanism for raising the bottom 25 and keeping it in a predetermined position comprises a hand lever 60 having a forked end 601 pivoted at 61 on the lower end of the bracket 21. The lever 60 is bent so that the forked end thereof will be offset and the handle 62 of the same will extend to the right of and below the shelf 42. The parts of the forked end of the lever pass on opposite sides of the plunger stem 22 and have links 63 pivoted at their outer ends. The link 63 is pivoted to a release dog 64, the inner pivoted end of which extends into a recess 65 in a lifting link 66 which is shown in detail in Figs. 9 and 10. As shown, the stem 22 of the plunger passes through the opening 67 in the lifting link and teeth 68, 69 at opposite sides of the opening 67 serve to engage the faces of the stem 22 and bind the same when the lever 60 is operated.

The free end of the link 66 normally rests in and fulcrums in a notch 70 at the inner face of the bracket 21. A load or supporting link 71, similar to the lifting link 66, is pivoted at 72 above the notch 70 and on the inner side of the bracket 21. The other end of the link 71 is free and the teeth on the inner side thereof will grip the stem 22 of the plunger and act as a clutch to support the plunger and bottom 25 in any desired position. The free end of the link 71 may be lifted by the engagement of the projection 73 of the dog therewith. A spring 74 having its ends secured to the dog and to the frame, tends to withdraw the dog 64 and projection 73 from beneath the end of the link 71 to release the latter so that it may be free to clutch the stem 22. To operate the dog 64 so that the end 73 thereof will raise the free end of the link 71 and cause the release of the plunger, a grip 75 is pivoted adjacent the handle 62 and is connected by the rod 76 to the dog 64. The spring 74 normally holds the dog in disengagement.

The plunger may be raised by depressing the outer end of the lever 60, and at any desired position the load or supporting link 71 will act as a clutch and hold the plunger and the bottom 25 in a position so that the butter which has been forced out at the upper end of the frame 30 can be cut off by swinging the frame 51 transversely.

From the foregoing description, it is believed that the operation of the device will be apparent. Butter taken from the churn is packed in the aluminum box or receptacle 26, which with the loose bottom in place is set in a cooling room for a few hours and allowed to harden. When the butter has solidified the box is placed on and secured to the table on the frame of the machine. The horizontal cutting frame 30 is then swung in place and fastened onto the top of the box, the cutter frame 51 being swung back out of the way. By moving the lifting lever 60 up and down, the plunger raises the loose bottom 25 and forces the contents of the box through the series of cross-wires in the frame 30. When a sufficient amount of butter has been forced out of the box to engage the underside 55 of the frame 51, the horizontal cutting wire 52 is brought around and drawn across the upper face of the cutter frame cutting in the present instance fifteen bricks of butter ready to be wrapped. The scraps along the sides are caught by the shelving and may be repacked in another receptacle. The cutting wires used are made of non-corrodible metal such as tempered silver or German silver. By adjusting the wire 52, the size of the brick may be varied. The construction of the machine makes it very simple to cut the butter into bricks of exactly the same dimensions and weight, requiring no patching or scraping off by the operator. On account of more recent weight regulations, it is necessary to market the butter in bricks weighing exactly the amount indicated and in many cutting machines now on the market a subsequent weighing of each brick is necessary. The machine constructed according to this invention is accurate to a high degree and requires no subsequent weighing of the bricks cut thereby.

It is to be understood that the invention is not limited to the exact details shown and described as numerous modifications are possible without departing from the spirit of the invention.

What is claimed is:

1. In a machine of the class described, the combination of a supporting frame, an open ended removable receptacle mounted thereon and constituting the container in which the material is packed, a movable bottom for said receptacle and removable with the receptacle, a plunger carried by the frame and arranged to lift the said bottom, means for operating the plunger, a stationary cutter frame, and a laterally rockable cutter device above the stationary cutting frame.

2. In a machine of the class described, the combination of a movable open ended receptacle constituting the container in which the material is originally packed, a loose bottom for said receptacle, means for raising said bottom and the material in said receptacle comprising a plunger engaging the under side of said bottom, a device for raising said plunger, a clutch for maintaining said plunger in any desired position, means for releasing said clutch, means for cutting the material vertically as it is extruded from the receptacle by the operation of said plunger, and a horizontally movable cutting device disposed above the before mentioned cutting means, and shelving disposed about a plurality of sides of the upper end of the receptacle.

3. In a cutting machine of the class described, the combination of a main supporting frame, a receptacle for the material open at one end and having a bottom loosely fitting the other end, said receptacle and bottom comprising the container in which the material is packed and transported to the machine, means for securing the receptacle to the main frame, a cutter frame comprising crossed wires supported at the open end of the receptacle, means for securing the cutter frame to the receptacle, shelving surrounding the cutter frame on all sides, and a horizontally movable cutting device mounted above the cutter frame.

4. In a butter cutting machine, the combination of a main supporting frame, a standard mounted thereon, a plunger carried by the main frame, a butter receptacle open at the upper end and having a false bottom fitting the lower end, said receptacle and bottom constituting the container in which the butter is packed and transported to the machine, said false bottom resting on the plunger and adapted to be raised by the latter, means for operating the said plunger, a cutter frame secured to the open end of said receptacle and comprising crossed wires, shelving surrounding the cutter frame, a horizontally movable cutting wire, and a frame pivoted to said standard and carrying said horizontally movable cutting wire.

5. In a butter cutting machine, the combination with a main supporting frame having a table provided with a central opening therein and a bracket adjacent said opening, a removable butter receptacle adapted to be secured to said table and having a false bottom and being open at the top, means for raising said false bottom and the material in the receptacle comprising a plunger, the head of which engages the under side of the false bottom and the shank of which passes down through the opening in the table, an operating lever pivoted to said bracket, a clutch link pivoted to said bracket, a lifting link pivotally connected to said operating lever, a releasing dog pivoted to the operating lever, means tending to hold the releasing dog out of connection with the clutch link, and means for operating said releasing dog to release the clutch link, a cutter frame supported at the upper open end of said receptacle, said cutter frame comprising a rectangular member having cross wires supported thereon to form rectangular interstices to cut the material vertically, a standard on the main frame, a cross cutting frame pivoted on said standard, and an adjustable cutting wire on said cross cutter frame.

6. In a machine of the class described, a cutting device comprising a frame having recesses in its lateral edges, rollers supported in said recesses, a single length of wire supporting on said frame and passing around said rollers and having parts extending across each other within the frame, and means on said frame for tensioning the wire.

7. In a machine of the class described, a cutting device comprising a rectangular frame having a channel in its outer edge, rollers disposed in and at intervals along said channel, a single length of wire supporting on said frame and passing around the rollers so that parts thereof will extend across each other within the frame, and tensioning means on the frame to which the ends of the wire are secured.

8. In a machine of the class described, a cutting device comprising a frame, wires crossing each other within the frame and attached to the lateral edges of the latter, shelves, and means on said shelves interlocking with means along the edges of said frame to detachably secure the shelves to the frame.

9. In a cutting machine of the class described, the combination of a supporting frame, a receptacle adapted to be set in place on said frame and secured thereto, a cutter frame detachably secured to said receptacle and having cross-wires, a transversely movable cutting device, and shelves disposed about the upper end of said cutter frame.

10. In a cutting machine, the combination of a supporting frame having a bracket, a cutter frame pivoted on the bracket and having cross-wires, and a transversely movable cutting device pivoted on the bracket above said cutter frame.

11. In a butter cutting machine, the combination of a supporting frame having a bracket, a receptacle adapted to be detachably secured to the frame, a cutter frame pivoted on the bracket and adapted to be detachably secured to the upper end of the receptacle, a transversely movable cutter pivoted on the bracket above said cutter frame, and means disposed about the cutter frame to catch scraps of butter.

12. In a machine of the class described, the combination with extruding means, of a receptacle for the material to be extruded and divided, said receptacle being constructed to be set in place on the frame of the machine and having a bottom engageable by said extruding means and movable toward the interior of the receptacle whereby it is unnecessary to remove the bottom from the receptacle to extrude the material therefrom in the operation of dividing said material.

13. In a machine of the class described, the combination of a frame, a receptacle constituting the container in which the material is packed and transported to the machine, means for detachably securing the receptacle in place on the frame, means for forcing the material from said receptacle comprising a plunger, a clutch for maintaining said plunger in any desired position of its travel, means for releasing said clutch, means for cutting the material vertically as it is forced from the receptacle, and means disposed above said cutting means for cutting the material horizontally.

14. In a machine of the class described, the combination of a frame, a receptacle, means for detachably securing the receptacle in place on the frame, means for forcing the material from said receptacle, a bracket on said frame, a cutter frame pivoted on said bracket and equipped with means for cutting the material vertically as it is forced from said receptacle, means for securing said cutter frame in place on said receptacle, and a horizontally movable device pivoted on the bracket above the cutter frame and adapted to cut the material horizontally.

In testimony whereof we affix our signatures in presence of two witnesses.

BURL L. LONGFELLOW.
ELWOOD C. ROGERS.

Witnesses:
C. A. CURTISS,
L. E. FAIRBANKS.

Copies of this patent may be obtained for five cents each, by addressing the "Commissioner of Patents, Washington, D. C."